(12) United States Patent
Ito

(10) Patent No.: US 6,503,164 B2
(45) Date of Patent: Jan. 7, 2003

(54) POWER TRANSMISSION BELT AND METHOD OF MANUFACTURING THE POWER TRANSMISSION BELT

(75) Inventor: Takehiko Ito, Kakogawa (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 09/794,701

(22) Filed: Feb. 27, 2001

(65) Prior Publication Data

US 2001/0039226 A1 Nov. 8, 2001

(30) Foreign Application Priority Data

Feb. 29, 2000 (JP) ........................................ 2000-052694
Jan. 25, 2001 (JP) ........................................ 2001-017629

(51) Int. Cl.$^7$ ................................................. F16G 3/10
(52) U.S. Cl. ...................................................... 474/263
(58) Field of Search .................................. 474/258, 260, 474/263, 264

(56) References Cited

U.S. PATENT DOCUMENTS 5,173,361 A * 12/1992 Yamashita et al. ........... 428/245
5,230,667 A * 7/1993 Nakajima et al. ............ 474/263
5,584,771 A * 12/1996 Isshiki et al. ................ 474/264
5,746,674 A * 5/1998 Tajima et al. ................ 474/253
6,238,314 B1 * 5/2001 Tajima ........................ 474/253

FOREIGN PATENT DOCUMENTS

JP          63-225745          * 9/1988

* cited by examiner

Primary Examiner—David A. Bucci
Assistant Examiner—Timothy McAnulty
(74) Attorney, Agent, or Firm—Wood, Phillips, Katz, Clark & Mortimer

(57) ABSTRACT

A power transmission belt having a body with a length, a first side, a second side, and laterally spaced side surfaces. The body has cog crests and cog troughs in at least a first layer on the first side of the body and alternating the length of the body. The body further has at least one cushion rubber layer and at least one load carrying cord embedded in the at least one cushion rubber layer and extending lengthwise of the body between the cog crests and the second side of the body. The at least first layer has a first joint that is in a cog crest and does not extend into a cog trough. At least one cushion rubber layer is made from a first material, with the first material from the at least one cushion rubber layer not penetrating the first joint. The invention is also directed to a method of forming a belt of this type.

18 Claims, 4 Drawing Sheets

US 6,503,164 B2

POWER TRANSMISSION BELT AND METHOD OF MANUFACTURING THE POWER TRANSMISSION BELT

BACKGROUND OF THE INVENTION

1. Field of the Invention

This invention relates to power transmission belts having alternating cog crests and cog troughs on at least one side thereof. The invention is also directed to a method of manufacturing such a belt.

2. Background Art

It is known to use belts with cog crests and cog troughs alternating along the length thereof in various systems, such as in snowmobiles, other types of vehicles, and in general industry applications. In one such system, speed shifting is effected by altering the effective diameters of driving and driven pulleys around which the belt is trained. A conventional type belt used in this environment may have the alternating cog crest and cog trough configuration on one or both sides of a belt body in a compression rubber layer and/or a tension rubber layer. Load carrying cords are commonly embedded in the cushion rubber layer between the tension and compression rubber layers.

In a conventional manufacturing process for producing this type of belt, a cog pad is preliminarily formed. The cog pad is formed from a sheet consisting of a reinforcing cloth, a non-vulcanized rubber sheet forming a compression rubber layer, and a non-vulcanized rubber sheet forming a cushion rubber layer. Cog troughs and cog crests are formed by pressing the cog sheet against a mold having a shape that is complementary to that desired, with the cog sheet at an elevated temperature. The resultant cog pad is separated and placed around a cylindrical support having slots and ridges that are complementary to the cog troughs and cog crests. The ends of the cog pad are then butt joined to produce an endless cylindrical shape. Load carrying cords, non-vulcanized sheets forming an additional cushion rubber layer and an additional tension rubber layer are sequentially applied to the cog pad, after which the entire assembly is vulcanized and thereafter cut to separate belts of desired width.

The cog pad is a lamination of one or more plies of reinforcing cloth and an unvulcanized rubber sheet which has cog crests and cog troughs spaced at a predetermined pitch along the belt length. Typically, the cog pad is manually cut to produce the desired length. It is conventional to count the number of cogs to determine the desired circumferential length of the belts and use chalk to mark the cutting positions to produce that length. The cog pad is typically cut at both of its ends at the top of a cog crest, using conventional cutting equipment.

In cutting the cog pad ends, it is desired to cut from side to side along a line that is orthogonal to the belt length. The plane of the joint at which the ends are butted is biased, i.e. non-perpendicular to a line extending along the length of the belt. If the cog pad is cut at a location spaced from a cog crest, it becomes difficult to join the ends of the cog pad to produce a straight butt line. A gap may result at the butt joint, potentially leading to volumetric cracks, and potentially making a defective joint. Thus, with this defect, there is a risk of crack formation at the joint, particularly in the event of a change of load or heat generation as the belt is running in operation.

Conventionally, the planes of the joints, made even at the cog crests, may extend to an adjacent cog trough. This can be seen on the conventional cog belt at 10, shown in FIG. 8. The belt 10 has a body 12 with cog crests (C) 14 and cog troughs (T) 16 alternating at regular intervals along the length of the belt body 12, as indicated by the doubled-headed arrow 18. A reinforcing cloth layer 20 is applied on one side 22 of the belt body 12 over the cog crests 14 and cog troughs 16. The other side 24 of the body 12 has alternating cog crests 26 and cog troughs 28, likewise alternating along the length of the belt body 12. At least one longitudinally extending load carrying cord 30 is embedded in cushion rubber layers 32,34.

In this belt 12, ends 36,38 of a rubber layer 40 are butt-connected to produce a bias joint 42 i.e. the plane thereof is non-perpendicular to a line extending lengthwise of the belt body 12. The joint 42 penetrates from a cog crest 14 to a cog trough 16, i.e. through to the region T. Rubber in the cushion rubber layer 34 tends to penetrate the trough 16 during the vulcanization process. This rubber migrates to the joint 42 at the end 44 thereof. A generally softer rubber in the cushion rubber layer 34 that has penetrated the rubber layer 40, typically a compression rubber layer, may adversely affect the integrity of the layer 40. This may result in the failure in the trough region due to fatigue resulting from repeated flexure. Cracks may generate at, or adjacent, the joint end 44 to thereby reduce the anticipated belt life. Cracks generated in the trough may propagate to the crest resulting in breakage thereof at the joint 42.

In FIG. 9, the belt 10 of FIG. 8 is shown with a joint 46, corresponding to the joint 42, wherein the joint 46 does not extend into the cog trough 16. In this embodiment, the rubber in the cushion rubber layer 34 tends to migrate into the joint 46 at the joint end 48 in the crest region. This reduces the thickness Ti of the cushion rubber layer 34 at the cog trough 16. As a result, the cog troughs 16 become more rigid, and are more prone to cracking as a result of fatigue from repeated flexing.

Short fibers in the rubber layer 40 orient, and conform to, the cog shape. With the belt 10 operated under high load, the belt side surfaces 50 (one shown) receive the sheering force from a cooperating pulleys. Crack-like grooves 52 following the cog contour may develop on the guide surfaces in contact with the pulleys. Crack-like grooves tend to also be developed at the joint 46. These grooves can potentially grow into lengthwise cracks, which may cause the belt 10 to break.

SUMMARY OF THE INVENTION

In one form, the invention is directed to a power transmission belt having a body with a length, a first side, a second side, and laterally spaced side surfaces. The body has cog crests and cog troughs in at least a first layer on the first side of the body and alternating along the length of the body. The body further has at least one cushion rubber layer and at least one load carrying cord embedded in the at least one cushion rubber layer and extending lengthwise of the body between the cog crests and the second side of the body. The at least first layer has a first joint that is in a cog crest and does not extend into a cog trough. At least one cushion rubber layer is made from a first material, with the first material from the at least one cushion rubber layer not penetrating the first joint.

In one form, there is no joint in the at least first layer that extends into a cog trough.

In one form, the at least one cushion rubber layer has a thickness between the at least one load carrying cord and the first side of the body that is substantially uniform between adjacent cog crests and cog troughs. The thickness may be uniform over the entire length of the body.

In one form, the first joint resides in a first plane that is angularly oriented to a second plane orthogonal to a line extending lengthwise of the body and extending between the first and second sides.

The first plane may make an angle of at least 60° with respect to the second plane and may be in the range of 65° to 90°.

The first plane may be substantially orthogonal to a line extending lengthwise of the body.

In one form, the first joint extends along a first line between the laterally spaced side surfaces, and the first line is substantially orthogonal to a second line extending lengthwise of the body.

The power transmission belt may further include a reinforcing cloth layer over the cog troughs and cog crests on the first side of the body. The reinforcing cloth has ends that are lapped at a cog crest that is spaced from the cog crest in which the first joint is formed.

The at least first layer may be a compression rubber layer.

The body may have alternating cog crests and cog troughs on the second side of the body.

The at least one cushion rubber layer may have a second joint that is spaced lengthwise from the first joint a distance equal to the spacing between adjacent cog crests.

In one form, the cushion rubber layer has the second joint that is spaced lengthwise from the first joint a distance at least equal to a spacing between adjacent cog crests.

The invention is further directed to a power transmission belt having a body having a length, a first side, a second side, and laterally spaced side surfaces. The body has cog crests and cog troughs in at least a first layer on the first side of the body and alternating along the length of the body. The body further has at least one cushion rubber layer and at least one load carrying cord embedded in the at least one cushion rubber layer and extending lengthwise of the body between the cog crests in the at least first layer and the second side of the body. The at least one cushion rubber layer has a thickness between the at least one load carrying cord and the first side of the body that does not vary between adjacent cog crests and cog troughs.

The thickness of the at least one cushion rubber layer between the at least one load carrying cord and the first side of the body may be substantially uniform over the entire length of the body.

The invention is also directed to a power transmission belt having a body with a length, a first side, a second side, and laterally spaced side surfaces. The body has cog crests and cog troughs in at least a first layer on the first side of the body and alternating along the length of the body. The body further has at least one cushion rubber layer and at least one load carrying cord embedded in the at least one cushion rubber layer and extending lengthwise of the body between the cog crests in the at least first layer and the second side of the body. The at least first layer has a first joint. The at least one cushion rubber layer has a first material, with the first material from the at least one cushion rubber layer not penetrating the first joint.

The invention is further directed to a method of manufacturing a power transmission belt with a body having a length and cog troughs and cog crests alternating along the length of the body. The method includes the steps of: forming a cog pad with first and second sides and having cog troughs and cog crests on the first side and first and second spaced ends; joining the first and second spaced ends at a first joint to produce an endless configuration; applying a cushion layer with first and second spaced ends against the second side of the cog pad and joining the first and second ends of the cushion layer at a second joint that is spaced lengthwise relative to the body from the first joint; wrapping a load carrying cord against the cushion layer; applying a second cushion layer over the load carrying cord; and vulcanizing the cog pad and cushion layers.

A rubber layer may be applied over the second cushion layer.

The first joint may reside entirely within a cog crest.

In one form, the second joint is spaced from the first joint by a distance at least equal to spacing between adjacent cog crests.

The method may further include the step of cutting the cog pad and cushion layers to a desired width after vulcanization.

The invention is further directed to a method of manufacturing a power transmission belt having a body with a length and cog troughs and cog crests alternating along the length of the body. The method includes the steps of: forming a cog pad with first and second sides and having cog troughs and cog crests on the first side and having first and second spaced ends; joining the first and second spaced ends at a first joint to produce an endless configuration, the first joint residing entirely within a cog crest; applying a cushion layer against the second side of the cog pad so that no joint in the cushion layer coincides with the first joint along the length of the body; wrapping a load carrying cord against the cushion layer; applying a second cushion layer over the load carrying cord; and vulcanizing the cog pad and cushion layers.

DETAILED DESCRIPTION OF THE DRAWINGS

Figure 1:
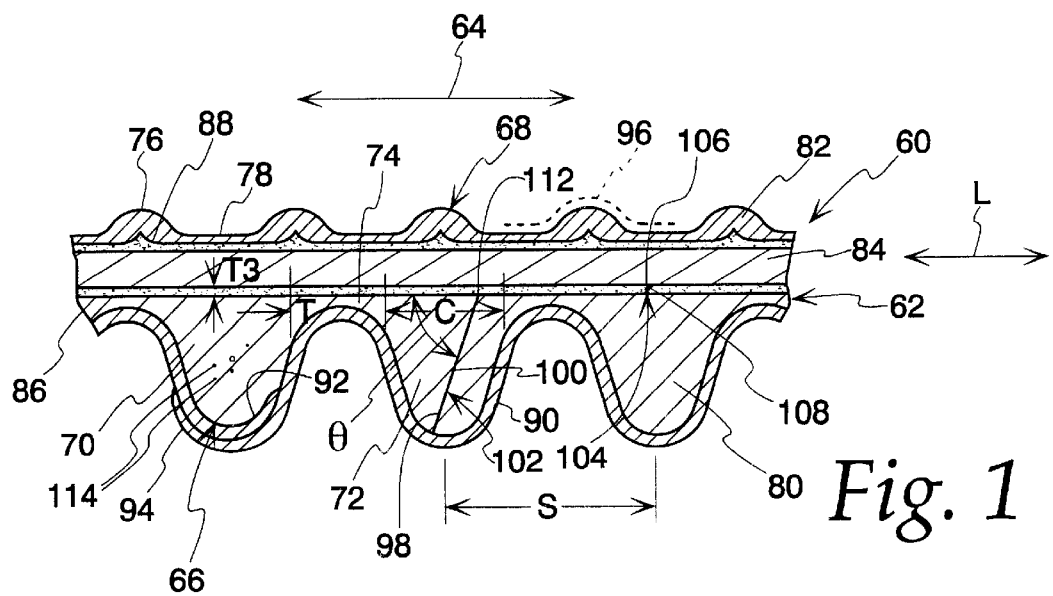
FIG. 1 is a fragmentary, cross-sectional view of a cogged, power transmission belt, made according to the present invention.

In FIG. 1, a power transmission belt, according to the present invention, is shown at 60. The belt 60 has a body 62 with a length, in the direction of the double-headed arrow 64, a first side 66, a second side 68, and laterally spaced side surfaces 70 (one shown). The body 62 has cog crests 72 and cog troughs 74 on the first side 66 of the body 62 and arranged alternatingly along the length of the belt at a predetermined spacing S. The lengthwise dimension of the cog troughs 74 is identified as "T", with the lengthwise dimension of the cog crests 72 is identified as "C". While cog crests 76 and cog troughs 78 are provided on the second side 68 of the belt body 62, the double-sided cog arrangement is not a requirement of the present invention.

In this embodiment, the cog crests 72 and cog troughs 74 are formed in a compression rubber layer 80, with the cog crests 76 and cog troughs 78 formed in a tension rubber layer 82. One or more load carrying cords 84 are embedded in cushion rubber layers 86,88. A reinforcing fabric cloth 90 is applied to the first side 66 of the belt body 62 over the cog crests 72 and cog troughs 74. Ends 92,94 of the fabric cloth 90 are lap joined at one of the cog crests 72. An optional cloth layer 96 may be applied to the second side 68 of the belt body over the cog crests 76 and cog troughs 78.

The compression rubber layer 80 has ends 98,100, to produce a flat joint 102. The plane of the joint 102 makes an angle e with respect to the length of the load carrying cord 84. The angle θ is within the range of 60° to 90° and more preferably in the range of from 65° to 90°. This produces a biased joint.

A separate joint 104 at butted ends 106,108 of the cushion rubber layer 86 is spaced from the joint 102 by a distance at least equal to the lengthwise extent of a cog crest 72. In any event, the spacing between the joints 102,104 is such that they do not coincide in a lengthwise direction, for reasons that will be explained below. In this embodiment, each of the joints 102,104 resides directly over a cog crest 72.

Preferably, the lapped ends 92,94 of the cloth 90 are located at a cog crest 72 that is spaced from the cog crests 72 at which the joints 102,104 are located. Through this arrangement, the areas of the belt 60 prone to cracking are separated, each from the other.

As a result of the longitudinal offsetting of the joints 102,104, rubber in the cushion rubber layer 86 does not migrate into the joint end 112 during vulcanization. As a result, the cushion rubber layer 86 may have a uniform thickness T3 between adjacent cog crests 76, and more preferably along the entire longitudinal extent of the belt body 62. As a result, the load carrying cords 84 are held with substantially uniform tenacity by the cushion rubber layers 86,88 throughout the entire belt length. Further, by reason of the uniformity of thickness of the cushion rubber layer 86, the flexing characteristics of the belt at 60, particularly at the cog troughs 74, may be made uniform throughout the entire belt length. Thus, the belt 60 can be constructed without a region at which the body 62 is prone to flexing fatigue after repeated bending.

Any joint (not shown) for the tension rubber layer 82 is preferably offset from the joints 102,104, however this is not required.

While one joint 102,104 is shown for each of the layers 80,86, two or more joints may be provided in each of these layers. It is desirable to disperse the joints, in a manner described above, to avoid stress concentration.

In the belt construction shown, the load carrying cords 84 may be made from polyester fiber, aramid fiber or glass fiber.

The rubber in the compression layer 80 and tension layer 82 may be one or more of natural rubber, butyl rubber, styrene-butadiene rubber, chloroprene rubber, ethylene-propylene rubber, alkylated chlorosulfonated polyethylene, hyrdonitrile rubber, a mixed polymer of hydro-nitrile rubber and an unsaturated metal carboxylate.

The rubber in the compression and tension layers 80,82 may have fibers 114 disposed therein. The fibers may be aramid fibers, polyamide fibers, polyester fibers, cotton fibers, or the like. The length of the fibers, which is preferably selected based upon the fiber type, is generally within a range of from 1 to 10 mm. Aramid fibers having a length of 3 to 5 mm are preferred. When using polyamide fibers, polyester fibers, or cotton fibers, a fiber length of from 5 to 10 mm is preferred.

The fiber lengths may be aligned to be orthogonal to a longitudinally extending line L. Preferably, the lengths of the fibers are aligned to be at an angle of 70 to 110° with respect to the line L.

While short reinforcing fibers may be provided in the cushion rubber layers 86,88, this is not preferred.

The reinforcing fabric cloth 90 may be made from one or more of cotton, aramid fiber, polyester fiber, or nylon. The cloth may be prepared by plain weaving, twill elastic webbing, or sateen weaving. The cloth may be a wide-angle canvas having a crossing angle of warp and weft within a range of about 90° to 120°. The cloth 90 may be prepared by friction coating a canvas with a rubber composition after an RFL treatment. A suitable RFL solution is prepared by mixing an initial condensate of resorcinol and formalin into a latex. The latex may be, for example, chloroprene, styrene-butadiene-vinylpyridine ternary copolymer, hydronitride, or NBR.

Figure 3:
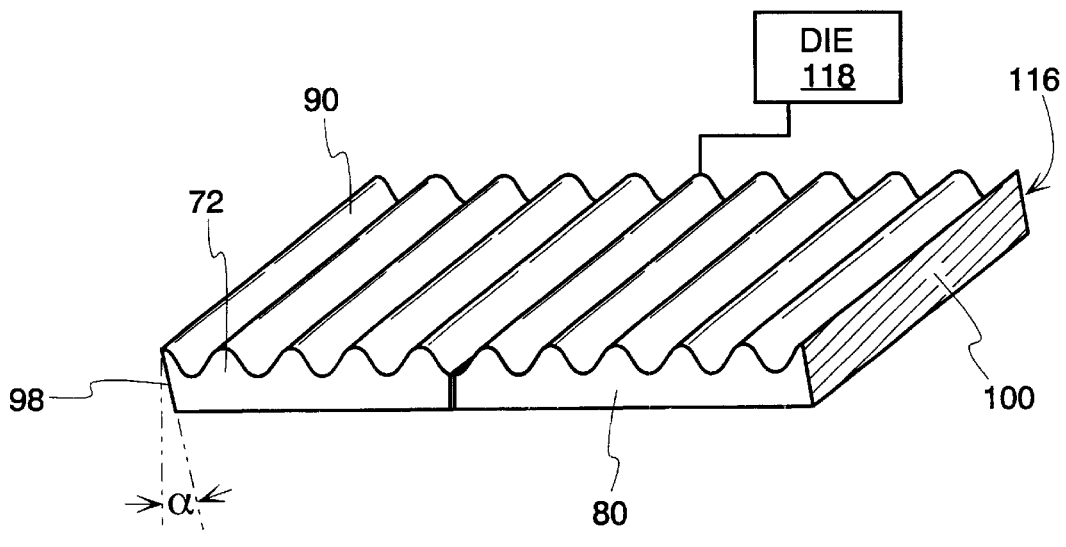
FIG. 3 is a perspective view of a cog pad that is part of the belt sleeve in FIG. 2.
Figure 4:
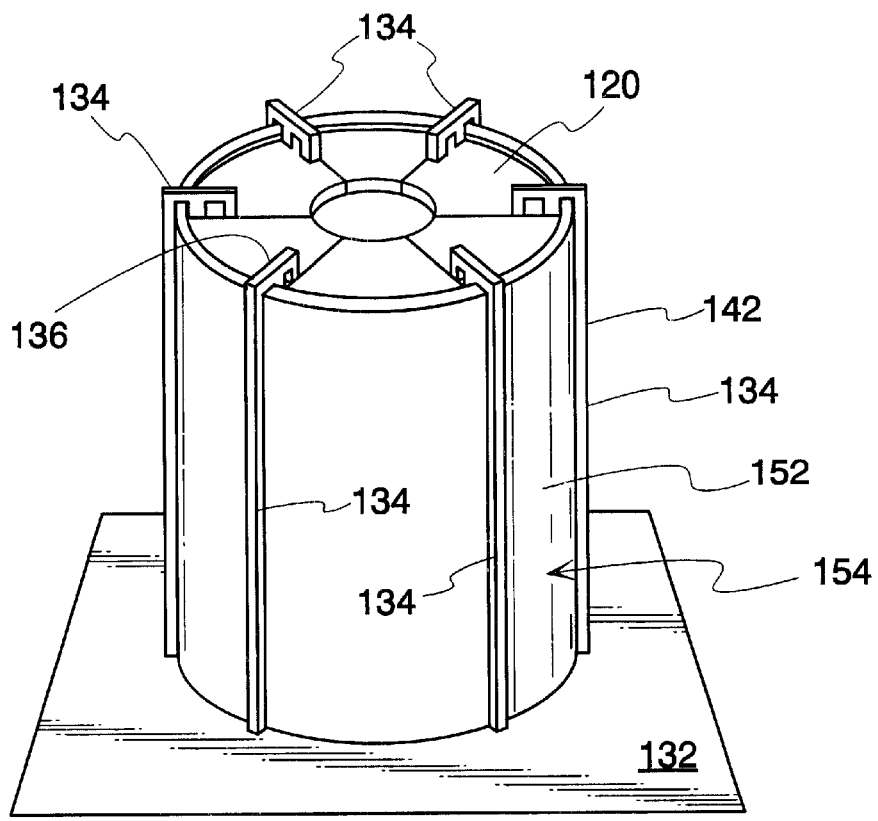
FIG. 4 is a perspective view of a support for a belt sleeve as in FIG. 2, used to align the belt sleeve for formation of cogs on the opposite side of the belt, and including removable guide elements.
Figure 5:
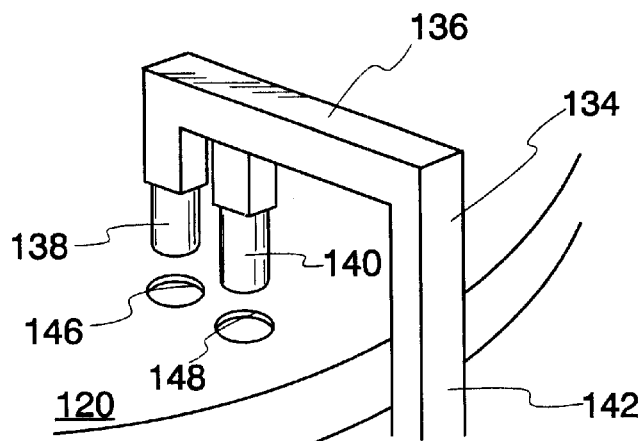
FIG. 5 is an enlarged, fragmentary perspective view of the connection of one of the guide elements at the top of the support.
Figure 6:
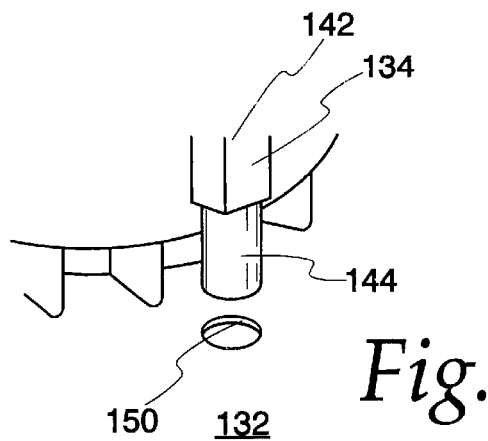
FIG. 6 is an enlarged, fragmentary perspective view of the connection of one of the guide elements at the bottom of the support.

In constructing the power transmission belt 60, according to the present invention, a cog pad is preformed, as shown at 116 in FIG. 3. The cog pad 116 consists of the rubber layer 80 and is preferably initially formed without the cushion rubber layer 86. The layer 80, with one or more sheets of the reinforcing cloth 90 applied thereto, is placed on a flat die 118 having alternating teeth and grooves that are complementary to the cog crests 72 and cog troughs 74. The sheet, consisting of the layer 80 and cloth 90, is heated and pressed against the die 118 to produce the cog pad 116 having the alternative cog crests 72 and cog troughs 74.

The opposite pad ends 98,100 are cut to be butt joined at a cog crest 72, as shown in FIG. 1. The one end 98 is cut at an angle a in the range of 0° to 40°, with the opposite end 100 cut sat a complementary angle to produce the configuration in FIG. 1. The ends 98,100 are then butted to each other. If the angle α is greater than 40°, there is a risk that the joint 102 will project into a cog trough 74.

Figure 2:
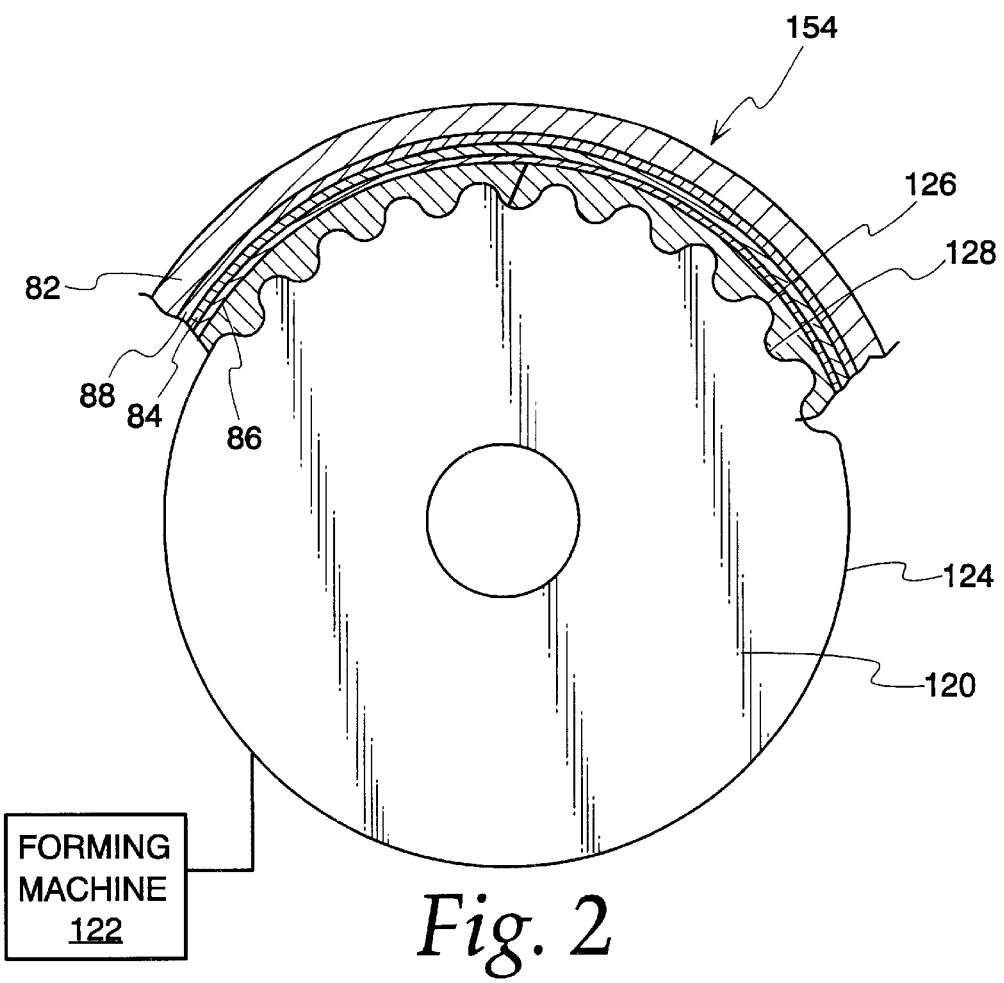
FIG. 2 is a fragmentary, end view of a belt sleeve built up upon a molding drum according to the present invention.

As shown in FIG. 2, a cylindrical mold 120 is utilized as part of a forming machine 122. A mold with a surrounding forming sleeve, known to those skilled in the art, may likewise be used. The mold 120 has an external surface 124 with ribs 126 and recesses 128 that are complementary to the cog trough 74 and cog crest 72, respectively. On the mold 120, the cog pad ends 98,100 are joined to produce the joint 102.

The cushion rubber layer 86 is cut to length, wrapped around the cog pad 116, and placed so that its ends 106,108 abut at the joint 104. As previously described, the joint 104 is spaced from the joint 102, such as at an adjacent cog crest 72, so that rubber in the cushion rubber layer 86 does not migrate into the joint 102.

After the cushion rubber layer 86 is applied, the load carrying cord 84 is wrapped, followed by the successive application of the cushion rubber layer 88 and the tension rubber layer 82. The mold 120 can then be removed from the forming machine 122 and placed on a supporting base 132, as shown in FIGS. 4–7.

L-shaped guide bars/elements 134 are mounted to the mold 120 and to a support base 132. The guide bars 134 may be made from metal or a synthetic resin. Each guide bar 134 has a horizontal leg 136 with two cylindrical posts 138,140 depending therefrom. A longer, vertical leg 142 terminates at a depending cylindrical post 144.

Figure 7:
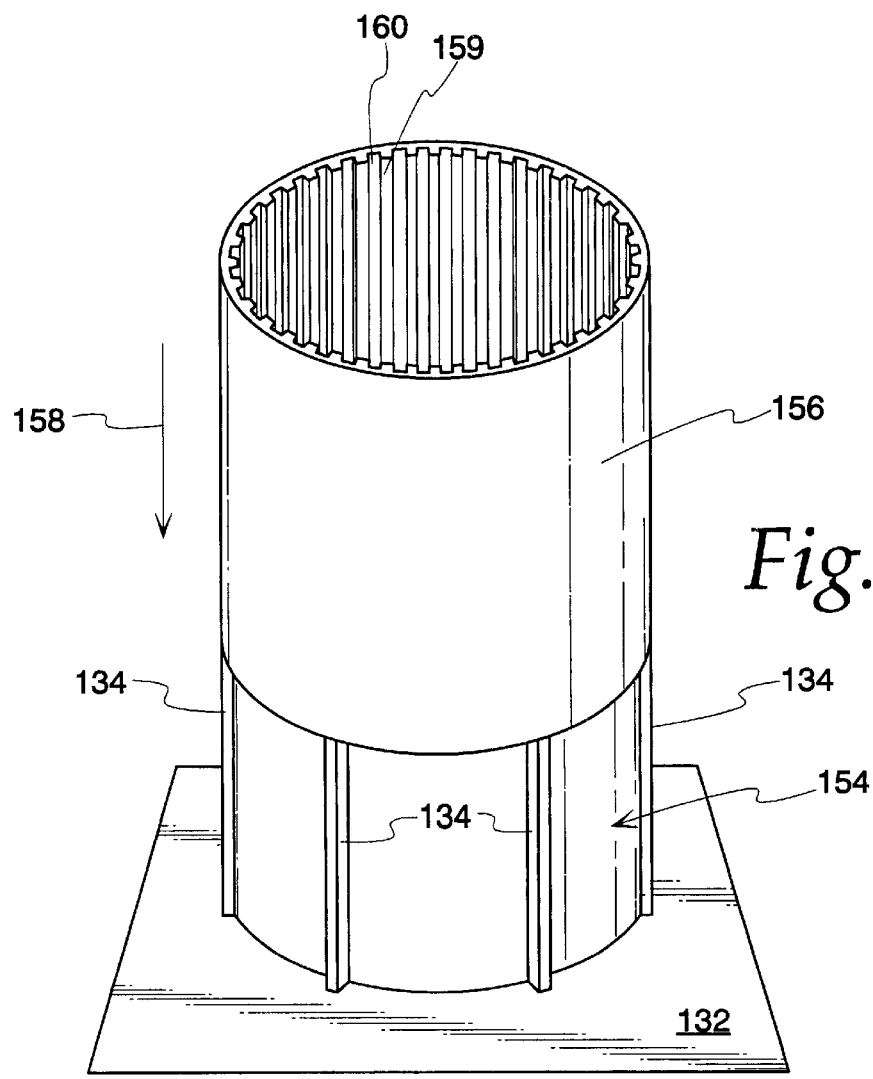
FIG. 7 is a perspective view of the support with the belt sleeve partially directed into an operative position thereover.

The posts 138,140 are configured to seat in openings 146,148 in the mold 120 simultaneously as the post 144 seats in an opening 150 in the support base 132. Through this arrangement, the guide bars 134 can be assembled by a simple downward translatory movement and disassembled by a reverse action. With the guide bars 134 operatively positioned, the vertical legs 142 bear on, or are spaced slightly from, the outside surface 152 of a belt sleeve 154 defined by the sequentially built up components. The guide bars 134 are installed at six circumferentially spaced locations, though this number may vary. As shown in FIG. 7, once the guide bars 134 are installed, an outer sleeve 156 is directed downwardly, in the direction of the arrow 158, over the belt sleeve 154. The outer sleeve 156 is preferably a vulcanized rubber sleeve with ribs 159 and recesses 160 alternating around the inner circumference thereof. The recesses 160 are designed to align circumferentially with the guide bars 134 so that the guide bars 134 slide within the recesses 160 as the outer sleeve 156 is directed downwardly as shown in FIG. 7.

The guide bars 134 are of a size sufficient to guide vertical movement of the outer sleeve 156 by movement guidingly within the recesses 160. The vertical leg 142 on each guide bar is dimension to be guided within the recesses 160 without binding. There is no particular limitation on the cross-sectional shape of the legs 142. For example, they may be circular, elliptical, or rectangular, as shown. The guide bars 134 are optionally used, in the above process, which may alternatively be carried out by manually aligning elements without the guide bars 134.

Once the outer sleeve 156 is directed fully downwardly to engage the support base 132, the circumferential alignment between the outer sleeve 156 and the belt sleeve 154 is established. The guide bars 134 can then be moved. The entire subassembly shown in FIG. 7, absent the guide bars 134, can then be placed in a vulcanizing vessel. Upon completion of vulcanization, a surrounding jacket used during vulcanization, the outer sleeve 156, and then the belt sleeve 154 are removed from the mold 120. The belt sleeve 154 is then cut to a predetermined width to produce individual belts. During the vulcanization process, the outer sleeve 156 forms the cog crests 76 and cog troughs 78 on the side 68 of the belt 60.

The advantages of the present invention will be demonstrated below with reference to specific examples.

EXAMPLE 1

A load carrying cord was formed using a twisting configuration of 2×3 by twisting 1,500 denier aramid fibers, of the type sold commercially under the mark TWARON™. The cord was twisted in a top/bottom reverse direction, with a final twist of 19.7/10 cm and a primary twist of 15.8/10 cm. The load carrying cord had a total denier of 9,000.

The untreated cord was pre-dipped with an isocyanate-based adhesive, dried at a temperature of approximately 170° to 180° C., and immersed in an RFL solution. The resulting cord was subjected to a draw thermo-fixing treatment at a temperature of 200° to 240° C. to complete a treated cord.

A mixed twisted thread of aramid fibers of the type sold commercially under the mark TWARON™, and polyethylene terephthalate fibers, at a weight ratio of 50:50, was used as a reinforcement cloth. The resulting cloth was a plain-woven canvas. The sheets of canvas were dipped in an RFL solution and heat treated at 150° C. for two minutes to make the treated canvas. Thereafter, the treated canvas was friction coated with a rubber composition to produce a rubberized canvas.

A rubber composition, including chloroprene rubber containing short aramid fibers, was used to make each of the compression rubber layer and tension rubber layer. A rubber composition consisting of chloroprene rubber with short fibers was used for the cushion rubber layers. Two sheets having different thicknesses were prepared for the compression rubber layer.

A cog pad was prepared by placing a laminated sheet, including a reinforcing cloth and compression rubber layer, against a flat die having alternating teeth and grooves. The sheet was formed by pressing the same at 80° C. against the die. The ends of the resultant cog pad were bias cut at the top of a cog crest.

The cog pad was wrapped onto a cylindrical mold and the ends thereof butted and joined. Around the cog pad, the cushion rubber layer was applied and its ends joined at a location circumferentially spaced from the joint in the cog pad. Thereafter, a load carrying cord was wound, followed by another cushion rubber layer and a tension rubber layer.

An outer forming sleeve was then placed around the resulting belt sleeve and placed in a vulcanizing vessel in which vulcanization was carried out. The resultant sleeve was cut by a cutter into a V-shape to make double cog belts of the type usable for a snowmobile.

The resulting belts had joints only in the cog crest region of the compression rubber layer, with the joint being a bias joint. The rubber in the adjacent cushion rubber layer could not penetrate the adjacent joint end, as a result of which the cushion rubber layer at the joint had a uniform thickness.

The belt was mounted on a vertical running testing system including a driving pulley having a diameter of 120 mm and a driven pulley having a diameter of 120 mm. A tension pulley, with a diameter of 65 mm, was brought into contact with the back of the belt, with a belt bending angle of 160° maintained. A load of 50 kgf was applied to the driven pulley. The driving pulley was rotated at 3,600 rpm. After running, the results showed that the belt did not break even after 413 hours of running. No cracks were observed at the ends of the joint, whereas cracks occurred at the other cog troughs.

Comparative Example 1

Figure 8:
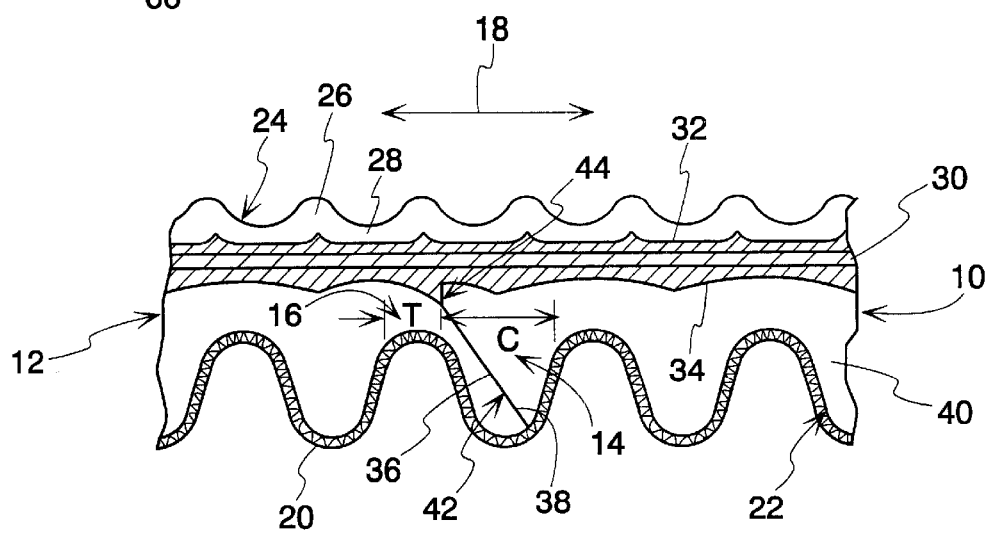
FIG. 8 is a fragmentary, cross-sectional view of a conventional belt made with one type of cog pad joint.

Starting with a sheet, including a reinforcing cloth, a compression rubber layer, and a cushion rubber layer, a cog pad was prepared in the same manner as described for Example 1. The cog pad was wound around a mold and the ends thereof butted to produce a bias joint. A load carrying cord, a flat cushion rubber layer, and a tension rubber layer were sequentially wound around the cog pad in the same manner as described with respect to Example 1. The resulting belt was similar to that shown in FIG. 8. The bias joint extended through a cog crest into a cog trough. Inflow of rubber from the cushion rubber layer was observed at the end of the joint. After a belt running test, breakage at the joint in the cog trough occurred after 312 hours.

Comparative Example 2

A cog pad was prepared from a sheet consisting of a reinforcing cloth, a compression rubber layer and a cushion rubber layer, in the same manner as described with respect to Example 1. The cog pad was wound on a sleeve on an inner mold in a vertical joint form. A load carrying cord, cushion rubber layer, and tension rubber sheet were sequentially wound around the cog pad to produce a belt in the same manner as described for Example 1.

Figure 9:
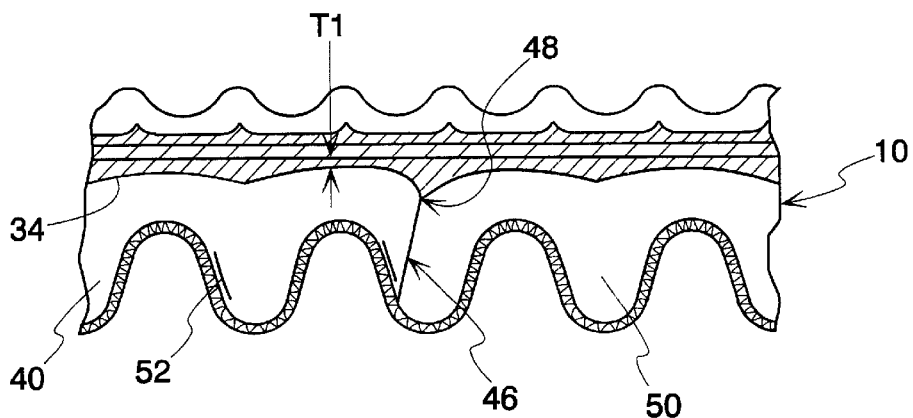
FIG. 9 is a view as in FIG. 8 of the belt in FIG. 8 made using another type of cog pad joint.

The resulting belt had the construction shown in FIG. 9. While the joint was restricted to the cog crest region, the cushion rubber layer flowed into the joint at the end thereof during vulcanization.

With the belt running, breakage of the joint at the cog trough occurred in 350 hours. The running time before breakage was slightly longer than that for Comparative Example 1.

The invention makes possible the manufacture of a power-transmission belt with high load transmission capability and with good flexibility and crack resistance, particularly at the trough region.

The foregoing disclosure of specific embodiments is intended to be illustrative of the broad concepts comprehended by the invention.

What is claimed is:

1. A power transmission belt comprising:
   a body having a length, a first side, a second side, and laterally spaced side surfaces,
   said body comprising:
   a) cog crests and cog troughs in at least a first layer on the first side of the body and alternating along the length of the body;
   b) at least one cushion rubber layer; and
   c) at least one load carrying cord embedded in the at least one cushion rubber layer and extending lengthwise of the body between the cog crests in the at least first layer and the second side of the body,
   wherein the at least first layer has a first joint that is in a cog crest and does not extend into a cog trough, wherein the at least one cushion rubber layer comprises a first material and the first material from the at least one cushion rubber layer does not penetrate the first joint.

2. The power-transmission belt according to claim 1 wherein there is no joint in the at least first layer that extends into a cog trough.

3. The power-transmission belt according to claim 1 wherein the at least one cushion rubber layer has a thickness between the at least one load carrying cord and the first side of the body that is substantially uniform over the entire length of the body.

4. The power transmission belt according to claim 1 wherein the at least one cushion rubber layer has a thickness between the at least one load carrying card and the first side of the body that does not vary between adjacent cog crests and cog troughs.

5. The power transmission belt according to claim 1 wherein the first joint resides in a first plane that is angularly oriented to a second plane orthogonal to a line extending lengthwise of the body and extending between the first and second sides.

6. The power-transmission belt according to claim 3 wherein the first joint resides in a first plane that is angularly oriented to a second plane orthogonal to a line extending lengthwise of the body and extending between the first and second sides.

7. The power transmission belt according to claim 5 wherein the first plane makes an angle of at least 60° with respect to the second plane.

8. The power transmission belt according to claim 1 wherein the first joint resides in a first plane that is substantially orthogonal to a line extending lengthwise of the body.

9. The power transmission belt according to claim 1 wherein the first joint extends along a first line between the laterally spaced side surfaces and the first line is substantially orthogonal to a second line extending lengthwise of the body.

10. The power transmission belt according to claim 5 wherein the first plane makes an angle of from 65° to 90° with respect to the second plane.

11. The power transmission belt according to claim 1 wherein the power transmission belt further comprises a reinforcing cloth layer over the cog troughs and cog crests on the first side of the body and the reinforcing cloth has ends that are lapped at a cog crest that is spaced from the cog crest which the first joint is formed in.

12. The power transmission belt according to claim 1 wherein the at least first layer is a compression layer comprising rubber.

13. The power transmission belt according to claim 1 wherein the body comprises alternating cog crests and cog troughs on the second side of the body.

14. The power-transmission belt according to claim 1 wherein the at least one cushion rubber layer has a second joint that is spaced lengthwise from the first joint a distance equal to a spacing between adjacent cog crests.

15. The power-transmission belt according to claim 1 wherein the at least one cushion rubber layer has a second joint that is spaced lengthwise from the first joint a distance at least equal to a spacing between adjacent cog crests.

16. A power transmission belt comprising:
    a body having a length, a first side, a second side, and laterally spaced side surfaces,
    said body comprising:
    a) cog crests and cog troughs in at least a first layer on the first side of the body and alternating along the length of the body;
    b) at least one cushion rubber layer; and
    c) at least one load carrying cord embedded in the at least one cushion rubber layer and extending lengthwise of the body between the cog crests in the at least first layer and the second side of the body,
    wherein the at least one cushion rubber layer has a thickness between the at least one load carrying cord and the first side of the body that does not vary between adjacent cog crests and cog troughs wherein the at least first layer has a first joint that is in a cog crest, wherein the at least one cushion rubber layer has a second joint that is spaced from the first joint a distance at least equal to a spacing between adjacent cog crests.

17. The power transmission belt according to claim 16 wherein the thickness of the at least one cushion rubber layer between the at least one load carrying cord and the first side of the body is substantially uniform over the entire length of the body.

18. A power transmission belt comprising:
    a body having a length, a first side, a second side, and laterally spaced side surfaces,
    said body comprising:
    a) cog crests and cog troughs in at least a first layer on the first side of the body and alternating along the length of the body;
    b) at least one cushion rubber layer; and
    c) at least one load carrying cord embedded in the at least one cushion rubber layer and extending lengthwise of the body between the cog crests in the at least first layer and the second side of the body,
    wherein the at least first layer has a first joint,
    wherein the at least one cushion rubber layer comprises a first material and the first material from the at least one cushion rubber layer does not penetrate the first joint.

* * * * *